United States Patent [19]

Brady et al.

[11] 4,320,535
[45] Mar. 16, 1982

[54] ADAPTIVE INTERFERENCE SUPPRESSION ARRANGEMENT

[75] Inventors: Douglas M. Brady, Fair Haven; Anita M. Gupta, Middletown, both of N.J.

[73] Assignee: Bell Telephone Laboratories, Incorporated, Murray Hill, N.J.

[21] Appl. No.: 81,552

[22] Filed: Oct. 3, 1979

[51] Int. Cl.³ ............................................. H04B 1/10
[52] U.S. Cl. .................................. 455/278; 455/303; 343/100 LE
[58] Field of Search .................. 455/63, 65, 272, 273, 455/276, 278, 283, 284, 296, 303, 305; 343/100 CL, 100 LE

[56] References Cited

U.S. PATENT DOCUMENTS

| Re. 27,478 | 9/1972 | Battail et al. | 455/206 |
|---|---|---|---|
| 2,520,184 | 8/1950 | Ullrich | 343/100 R |
| 3,094,695 | 6/1963 | Jahn | 343/100 LE |
| 3,369,235 | 2/1968 | Odams et al. | 343/100 LE |
| 3,582,790 | 6/1971 | Curtis | 455/276 |
| 3,696,429 | 10/1972 | Tressa | 455/79 |
| 3,987,444 | 10/1976 | Masak et al. | 343/100 LE |
| 4,057,802 | 11/1977 | Dollinger | 343/100 LE |

OTHER PUBLICATIONS

NTC 76 Conf. Record, Nov. 29–Dec. 1, 1976, Article By E. D. Horton, pp. 13.4–1 to 13.4–5.
ICC 77 Conf. Record, vol. 3, Chicago, Ill. Jun. 12–15, 1977, Article By P. D. Lubell et al., pp. 49.3–284 to 49.3–289.
Electronics Letters, vol. 14, No. 24, Nov. 23, 1978, Article By P. Delogne et al. pp. 770–772.
"Final Technical Report" By Gillingham 6/1979.

*Primary Examiner*—Jin F. Ng
*Attorney, Agent, or Firm*—Erwin W. Pfeifle

[57] ABSTRACT

The present invention relates to an adaptive interference suppression arrangement. In the present arrangement, a main antenna (10) picks up the desired signal and some interfering signal and a small auxiliary antenna (20) is pointed in the direction of the interfering source and picks up a sample of the interfering signal. The interfering sample is then put through a quadrature modulator (24) for adjustment of its phase and amplitude to provide an estimated cancellation signal at the output. This estimated cancellation signal is then combined with the main antenna output to give a corrected signal. After down-converting, the present system detects the power in the corrected signal and a processor (32), in response to such power detection, generates a small dither signal which is added to the control signals to vary the phase and amplitude in the quadrature modulator of the residual interference in the corrected signal.

3 Claims, 3 Drawing Figures

4,320,535

ADAPTIVE INTERFERENCE SUPPRESSION ARRANGEMENT

TECHNICAL FIELD

The present invention relates to an adaptive interference suppression arrangement and, more particularly, to an adaptive interference suppression arrangement wherein a desired signal including an interfering signal and a sample of the interfering signal are separately received, an estimated cancellation signal is derived and combined with the desired and interfering signal sample to give a corrected signal, and the power in the corrected signal is detected and used to generate a control signal for varying the phase and amplitude of the estimated cancellation signal to reduce the residual interference in the corrected signal.

BACKGROUND ART

Interference from terrestrial microwave systems is a major consideration in planning the location of earth stations for satellite communication systems. As the desirable locations for both microwave relay stations and satellite earth stations tend to be the same, there will exist some situations in which interference cannot be avoided.

Adaptive interference suppression systems have been designed to deal with this problem. In this regard see, for example, "An Adaptive Co-channel Interference Suppression System to Suppress High Level Interference in Satellite Communication Earth Terminals" by E. D. Horton in *National Telecommunication Conference Record*, Dallas, Tex., Nov. 29–Dec. 1, 1976, Sect. 13.4, pp. 1–5 and "Suppression of Co-channel Interference with Adaptive Cancellation Devices at Communications Satellite Earth Stations" by P. D. Lubell et al in *ICC* 77 Conference Record, June 12–15, 1977, Chicago, Ill., Vol. 3, pp. 49.3-284–49.3-289. In these disclosed systems, an independent sample of the interfering signal is obtained, the phase and amplitude of which is adjusted by an adaptive filter to provide an estimate of the interference in the received signal. This estimate is then subtracted from the received signal to give the undistorted desired signal and a residue from the subtract operation. The response of the adaptive filter depends on the correlation between this residue and the interference sample.

The correlation in the cited articles is done either at RF or IF. The IF realization requires an independent down converter for the interference sample adding substantially to the cost of the system. The RF realization presents problems when a number of interfering sources are present. The correlation is done over the whole 500 MHz bandwidth and due to the frequency dependence of the side lobe pattern of the main antenna one can get varying degrees of cancellation and enhancement over the band. Therefore, the problem remaining in the prior art is to provide an adaptive interference suppression arrangement which can avoid the above-mentioned independent down converter and provides interference suppression in a desired band of frequencies.

SUMMARY OF THE INVENTION

The foregoing problem in the prior art has been solved in accordance with the present invention which relates to an adaptive interference suppression arrangement and, more particularly, to an adaptive interference suppression arrangement wherein a desired signal including an interfering signal and a sample of the interfering signal are separately received, an estimated cancellation signal is derived and combined with the desired and interfering signal sample to give a corrected signal, and the power in the corrected signal is detected and used to generate a control signal for varying the phase and amplitude of the estimated cancellation signal to reduce the residual interference in the corrected signal.

It is an aspect of the present invention to provide an adaptive interference suppression arrangement wherein a main antenna picks up the desired signal and some interfering signal and a small auxiliary antenna is pointed in the direction of the interfering source and picks up a sample of the interfering signal. The interfering sample is then put through a quadrature modulator for adjustment of its phase and amplitude and provide an estimated cancellation signal at the output. This estimated cancellation signal is then combined with the main antenna output to give a corrected signal. After down-converting, the present system detects the power in the corrected signal. A processor, in response to such power detection, correlates variations in power with a dither signal added to the control signals, and uses the resulting correlation to adjust the control signals to vary the phase and amplitude in the quadrature modulator to minimize the amplitude of the residual interference in the corrected signal.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
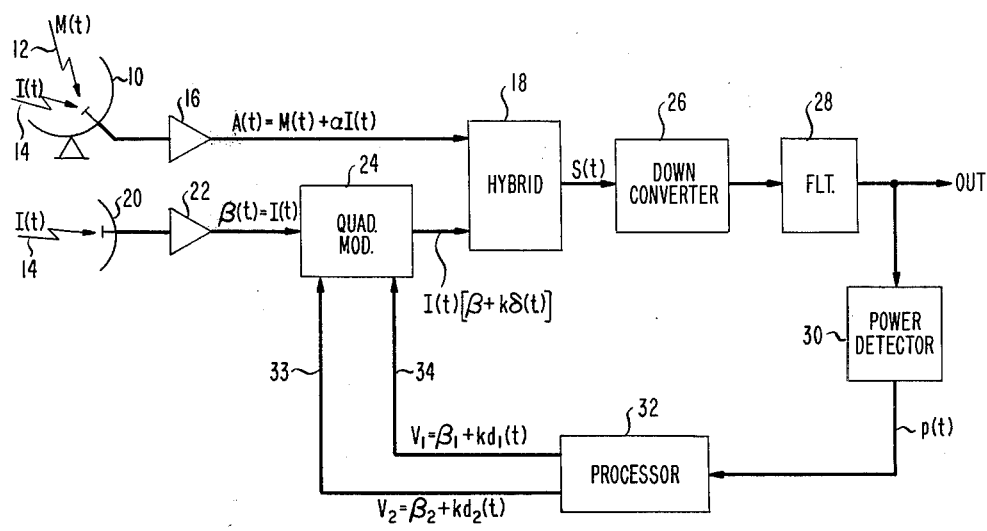
FIG. 1 illustrates a block diagram of an adaptive interference suppression arrangement in accordance with the present invention.

FIG. 1 is a block diagram of an adaptive interference suppression arrangement in accordance with the present invention. The description which follows is directed to the use of the present arrangement in a small earth station receiving terminal associated with a satellite communication system for suppressing an interfering signal concurrently received from a different direction with the desired signal from the satellite. It is to be understood that such description is exemplary only and is for purposes of exposition and not for purposes of limitation. It will be readily appreciated that the present arrangement can be used for suppressing a received interfering signal which concurrently arrives at a receiver from a different direction than a desired received signal in other than a satellite system receiver.

In the arrangement of FIG. 1, an antenna 10 is directed to receive a signal 12 transmitted from a satellite repeater (not shown), signal 12 being, for example, shown with the designation M(t), destined for the earth station including the present arrangement. Due to the location of the present earth station or the possibility that the present earth station also includes equipment associated with one or more terrestrial microwave systems, a second signal 14, designated I(t), associated with another communication system is also concurrently received at antenna 10, which causes interference with the desired signal 12. The signals 12 and 14 received at antenna 10 are amplified in a low noise type amplifier 16 and applied to one input of a hybrid circuit 18, which amplified signal can be represented by the expression $$A(t) = M(t) + aI(t). \tag{1}$$

A small auxiliary antenna 20 is pointed in the direction of the interfering signal source for picking up a sample of the interfering signal 14. As the satellite signal 12 flux density is generally much weaker than the flux density of the interfering terrestrial microwave signal 14, the sample of interfering signal 14 can be considered to be essentially free of the desired signal 12. The received interfering signal sample 14 is amplified to a predetermined level in a low noise type amplifier 22, which amplified interfering signal sample is then transmitted through a quadrature modulator 24 for adjustment of its phase and amplitude as will be explained in greater detail hereinafter. The adjusted signal from quadrature modulator 24 is applied to a second input of hybrid circuit 18. Antennas 10 and 20, amplifiers 16 and 22, quadrature modulator 24 and hybrid circuit 18 can comprise any suitable circuit or arrangement capable of performing the function described.

The output signal from quadrature modulator 24 provides an estimated interference cancellation signal which is combined with the amplified signal received by main antenna 10 in hybrid circuit 18 to provide a corrected signal, designated S(t), at the output thereof which is substantially free of interference signal 14. The corrected signal can next be demodulated to, for example, IF frequencies in down-converter 26 which demodulated signal is filtered in a band pass filter 28 to pass only a desired band of frequencies as an output to the receiving terminal (not shown).

In accordance with the present invention, a sample of the output signal of filter 28 is also applied to the input of a power detector 30 whose output voltage, designated p(t), is proportional to magnitude of the corrected signal squared, e.g., $|S(t)|^2$. It is to be understood that down converter 26, filter 28 and power detector 30 can comprise any suitable circuit which is available and functions as described. More particularly, power detector 30 obtains the envelope of the power of the corrected signal which resultant signal is at, for example, baseband frequencies and has lost coherence with the desired signal.

The output signal from power detector 30 is applied to the input of a processor 32 which generates control signals that are transmitted over leads 33 and 34 to the quadrature modulator 24 to appropriately vary the phase and amplitude of the interfering signal 14 received by antenna 20. The processor 32 also generates a dither signal which is added to the control signals to vary the phase and amplitude of the residual interference in the corrected signal S(t) from hybrid circuit 18 and achieve maximal interference suppression.

Figure 2:
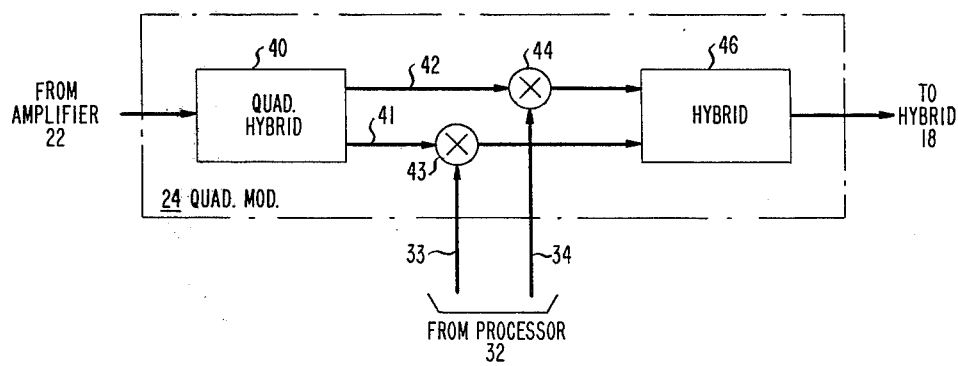
FIG. 2 illustrates a block diagram of an exemplary quadrature modulator for use in the arrangement of FIG. 1.

FIG. 2 illustrates a typical quadrature modulator 24 which can be used for adjusting the phase and amplitude of the interfering signal 14 received at antenna 20. The exemplary quadrature modulator 24 comprises a quadrature hybrid 40 which divides the interference signal sample 14 into two quadrature phased components which are transmitted as separate outputs on leads 41 and 42. Each of the quadrature phased components on leads 41 and 42 are modulated in mixers 43 and 44, respectively, by control signals from processor 32 on respective leads 33 and 34. The two components from mixers 43 and 44 are then recombined in a hybrid 46 to generate the estimated cancellation signal which is then combined with the main antenna 10 output in hybrid 18 to give the corrected signal S(t). It is to be understood that the quadrature hybrid 40, mixers 43 and 44 and hybrid 46 of the exemplary quadrature modulator 24 shown in FIG. 2 can comprise any suitable circuit which is known. Additionally any other suitable quadrature modulator which is known may also be used.

Figure 3:
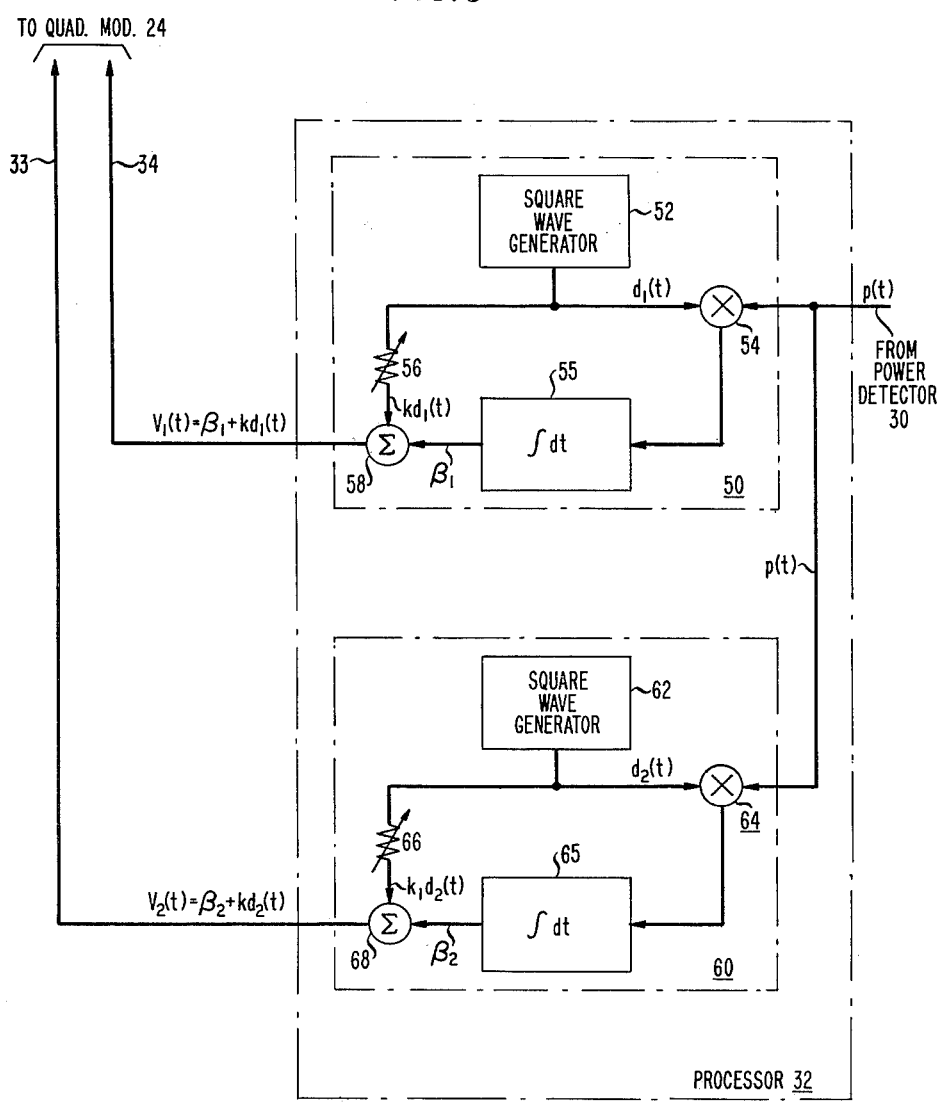
FIG. 3 illustrates a block diagram of a processor for use in the arrangement of FIG. 1.

FIG. 3 illustrates a block diagram of processor 32 for use in the present adaptive interference suppression arrangement to generate the necessary control signals for appropriately adjusting the phase and amplitude of the quadrature phased components in mixers 43 and 44 of exemplary quadrature modulator 24 of FIG. 2. Processor 32 is shown as comprising a first and a second control signal generating section designated 50 and 60, respectively.

First control signal section 50 includes a square wave generating source 52 which is capable of generating a square wave signal within a first frequency band within the baseband frequency but less then the bandwidth of the IF frequency band, which square wave signal is designated $d_1(t)$. Square wave signal $d_1(t)$ is applied to one terminal of a multiplying circuit 54 which multiplies this signal $d_1(t)$ with the output from power detector 30 to generate an output signal which is representative of such product. The output signal from multiplying circuit 54 is integrated with respect to time in an integrator circuit 55 which generates an output signal representative of such integration and is designated $\beta_1$.

The square wave signal $d_1(t)$ from generator 52 is also transmitted through a variable attenuator 56 to generate a desired weighted output signal which is designated $kd_1(t)$. Adjustment of variable attenuator 56 in turn adjusts the weighting factor, k, introduced in the square wave signal $d_1(t)$ passing therethrough. The output signal $\beta_1$ from integrator circuit 55 and the weighted square wave signal $kd_1(t)$ from attenuator 56 are added in summing circuit 58 to generate a control signal which has a small dither signal added thereto. This control and dither signal are transmitted over lead 34 to quadrature modulator 24 for appropriately varying the amplitude and phase of the signal being applied to mixer 44 on lead 42 in the exemplary modulator of FIG. 2.

Second control section 60 of processor 32 comprises an apparatus arrangement which corresponds to that of first control section 50. In second control section 60, a square wave generator 62 generates a square wave signal $d_2(t)$ at a second frequency band within the baseband frequency but less than the bandwidth of the IF frequency band. It is to be understood that the first frequency band and the second frequency band generated by square wave generators 52 and 62, respectively, comprise different frequency bands within the bandwidth of the baseband frequency.

The square wave signal from generator 62 and designated $d_2(t)$ is multiplied with the output signal from power detector 30 in a multiplying circuit 64 which resultant signal is integrated over time in integrator circuit 65. The square wave signal from generator 62 is weighted by variable attenuator 66 to provide a weighted output signal designated $kd_2(t)$. The weighted output signal from variable attenuator can be controlled by adjustment of the variable attenuator and such desired signal is added to the output of integrator 65, designated $\beta_2$, in summing circuit 68. The output of summing circuit 68 is a control signal with a small dither signal added which is applied over lead 33 to quadrature modulator 24 for appropriately varying the amplitude and phase of the signal being applied to mixer 43 on lead 41 in the exemplary modulator of FIG. 2. It is to be understood that square wave generators 52 and 62, multipliers 54 and 64, integrators 55 and 65, variable attenuator 56 and 66 and summing circuits 58 and 68 can comprise any suitable circuit for achieving the functions described hereinbefore.

In operation, antennas 10 and 20 are properly oriented towards the satellite and interference source, respectively, and the received signals pass through the various circuits shown in FIGS. 1-3 as outlined hereinbefore. Attenuators 56 and 66 of processor 32 are then adjusted until the power level at the output of filter 28 is at a minimum. Such minimum value indicates that the power level of the interference signal has been substantially minimized to a zero value and basically only the desired signal, $M(t)$, forms the output signal of the present adaptive interference suppression arrangement.

For an analysis of the present arrangement, it will be assumed that the main antenna 10 output is represented by equation (1) as indicated hereinbefore, and that the auxiliary antenna 20 output is represented by $$B(t) = I(t) \quad (2)$$

as indicated hereinbefore where $M(t)$ and $I(t)$ are the desired and interfering signal, respectively. The output from quadrature modulator 24 can then be represented by $$[\beta + k\delta(t)]I(t) \quad (3)$$

where $k\delta(t)$ is a small dither signal which is used for correlation and is continuously fed by processor 32. This dither signal can be represented by $$\delta(t) = d_1(t) + j\, d_2(t) \quad (4)$$
$$= [Sgn(cos\omega_1 t) + j\, Sgn(cos\omega_2 t)]$$

where $d_1(t)$ and $d_2(t)$ are the two independent square waves generated by generators 52 and 62, respectively. $\beta(t) = \beta_1(t) + j\beta_2(t)$ is the control voltage generated by processor 32.

The corrected signal $S(t)$ generated at the output of hybrid 18 will be $$S(t) = M(t) + [\alpha + \beta + k\delta(t)]I(t) . \quad (5)$$

A sample of the corrected signal is fed to a power detector 30 whose output voltage $p(t)$ is proportional to $|S(t)|^2$. Therefore, $$p(t) = C[\,|S(t)|^2\,] \quad (6)$$
$$= C[\,|M(t)|^2 + \{\alpha + \beta + k\delta(t)\}\{\alpha + \beta + k\delta(t)\}^* \,|I(t)|^2$$
$$+ \text{terms involving the cross product } M(t)I(t)]$$

where the symbol * denotes the complex conjugate.

The mean of the contribution from terms involving the cross product of the two signals would be zero as they will be uncorrelated. It would, however, introduce a variance in the control voltage the magnitude of which would depend on the frequency separation between the two carriers, their spectral shape and the filtering before and after the power detector. For the purpose of this analysis this contribution has been assumed to be zero from now on. So $$p(t) = C[\,|M(t)|^2 + \{|(\alpha+\beta)|^2 + k^2|\delta(t)|^2 + k\delta(t)(\alpha+\beta)^* + k\delta^*(t)(\alpha+\beta)\}|I(t)|^2] \quad (7)$$

The output of the power detector 30 is now multiplied by $\delta(t)$ in multipliers 54 and 64 to determine the correlation and then integrated in integrators 55 and 65 to give the control voltage $\beta(t)$ which is represented by $$\overline{p(t)\delta(t)} = C[\overline{\delta(t)}|M(t)|^2 + \{\overline{\delta(t)}|\alpha+\beta|^2 + k^2\overline{\delta(t)} + k\overline{\delta^2(t)}(\alpha+\beta)^* + k|\overline{\delta(t)}|^2(\alpha+\beta)\}|I(t)|^2] . \quad (8)$$

The time averages $\overline{\delta(t)}$ and $\overline{\delta^2(t)} = 0$ and, furthermore, $|\delta(t)|^2 = 2$. Therefore, $$\delta(t)p(t) = 2Ck(\alpha + \beta)|I(t)|^2 = \frac{-d\beta}{dt} \quad (9)$$

$$\beta(t) = -\alpha + \alpha \exp[-2Ck|I(t)|^2 t];\ \beta(0) = 0 .$$

So $\beta(t)$ the control voltage will in the steady state approach $-\alpha$. The effective time constant of this circuit depends on the magnitude of the dither $k$, the loop gain $C$ and also on the interference power received at the auxiliary antenna.

In an actual system, if the path lengths from the interfering source to the cancellation point are different for the main and auxiliary antenna outputs, the phase variations over the bandwidth of the interference will not be the same for the two paths and so the cancellation will not be equally effective over the total bandwidth of the interference. Path delay equalizers can be used in the auxiliary antenna output path to deal with this problem. Unequal cancellation over the band can also occur due to the frequency dependence of the sidelobes of the main antenna. It has been suggested that such problem may be overcome by using an equalizer to predistort the auxiliary antenna output to resemble the interference picked up by the main antenna sidelobes.

It is to be understood that the above-described embodiments are simply illustrative of the principles of the invention. Various other modifications and changes may be made by those skilled in the art which will embody the principles of the invention and fall within the spirit and scope thereof.

We claim:
1. An adaptive interference suppression arrangement comprising:
   a primary antenna (10) capable of receiving a signal which may include a first desired signal (12) and a second interfering signal (14);
   an auxiliary antenna (20) capable of receiving a signal including primarily the second interfering signal;
   means (24) capable of deriving quadrature components of the signal received at the auxiliary antenna and adjusting the amplitude and phase of said quadrature components in response to control signals for generating an estimated interference cancellation signal;
   combining means (18) capable of combining the output signals from the primary antenna and the esti- mated interference cancellation signal from the deriving and adjusting means for substantially cancelling the second interfering signal at the output thereof; and a correlator (30, 32) capable of generating the appropriate control signals to the deriving and adjusting means to cause substantial cancellation of the second interfering signal at the output of the combining means characterized in that the correlator comprises:

a power detector (30) capable of generating an output signal representative of the power envelope of the output signal of the combining means; and a processor (32) capable of generating the appropriate control signals in response to the output signal from said power detector for transmission to the deriving and adjusting means for appropriately adjusting the phase and amplitude of the second interfering signal quadrature components to achieve maximum cancellation of the second interfering signal at the output of the combining means.

2. An adaptive interference suppression arrangement in accordance with claim 1
characterized in that
the processor (32) comprises a first (50) and a second (60) control signal generating section, each section being capable of generating a control signal in response to the output signals from the power detector for appropriately adjusting the phase and amplitude of a separate one of the quadrature components in the deriving and adjusting means to cause said deriving and adjusting means to generate an estimated interference cancellation signal which maximally reduces the second interference signal at the output of the combining means.

3. An adaptive interference suppression arrangement in accordance with claim 2
characterized in that
each control signal generating section (50, 60) of the processor (32) comprises:

a square wave generator (52, 62) capable of generating a square wave output signal at a frequency band within a baseband frequency spectrum which is different than the frequency band of the square wave generator in the other control signal generating section;

means (54, 64) capable of multiplying together the instantaneous and concurrent output signal values of said power detector and said square wave generator to generate an output signal representative of such product;

means (55, 65) capable of providing an output signal representative of an integration with time of the output signal of said multiplying means;

means (56, 66) capable of appropriately weighting the output signal of said square wave generator to form a dither output signal; and means (58, 68) capable of adding the output signals of said integration means and said weighting means to generate the control signal for use in the deriving and adjusting means.

* * * * *